(12) United States Patent
Ma et al.

(10) Patent No.: US 11,346,942 B2
(45) Date of Patent: May 31, 2022

(54) TARGET POSITIONING DEVICE AND METHOD BASED ON PLECOTUS AURITUS DOUBLE-PINNA BIONIC SONAR

(71) Applicant: SHANDONG UNIVERSITY, Shandong (CN)

(72) Inventors: Xin Ma, Qingdao (CN); Sen Zhang, Qingdao (CN); Hongwang Lu, Qingdao (CN)

(73) Assignee: SHANDONG UNIVERSITY, Qingdao (CN)

( * ) Notice: Subject to any disclaimer, the term of this patent is extended or adjusted under 35 U.S.C. 154(b) by 254 days.

(21) Appl. No.: 16/628,715

(22) PCT Filed: Dec. 29, 2018

(86) PCT No.: PCT/CN2018/125446
§ 371 (c)(1),
(2) Date: Jan. 6, 2020

(87) PCT Pub. No.: WO2020/124681
PCT Pub. Date: Jun. 25, 2020

(65) Prior Publication Data
US 2021/0033728 A1    Feb. 4, 2021

(30) Foreign Application Priority Data

Dec. 17, 2018 (CN) .......................... 201811543317.4

(51) Int. Cl.
*G01S 15/42* (2006.01)
*G01S 7/527* (2006.01)
*G01S 15/46* (2006.01)

(52) U.S. Cl.
CPC ............ *G01S 15/42* (2013.01); *G01S 7/5273* (2013.01); *G01S 2015/465* (2013.01)

(58) Field of Classification Search
None
See application file for complete search history.

(56) References Cited

U.S. PATENT DOCUMENTS

2006/0098533 A1    5/2006   Hickling

FOREIGN PATENT DOCUMENTS

| CN | 105997448 A | 10/2016 |
|----|-------------|---------|
| CN | 106409109 A | 2/2017  |

(Continued)

OTHER PUBLICATIONS

Sep. 5, 2019 International Search Report issued in International Patent Application No. PCT/CN2018/125446.

(Continued)

*Primary Examiner* — Hovhannes Baghdasaryan
(74) *Attorney, Agent, or Firm* — Oliff PLC

(57) ABSTRACT

A target positioning device and method based on a plecotus auritus double-pinna bionic sonar. An echo positioning device based on bionic pinnae of a bat can determine an azimuth and an elevation of a target to locate the spatial location of the target by using echoes obtained by two array elements, resolving a problem that two array element antennas cannot locate the space coordinates. In a positioning method based on bionic pinnae of a bat according to filtering characteristics of bat ears, a method for estimating a spatial location by a neural network is used, and a pulse string estimation method is used to reduce the error of estimated angles, to obtain a precise azimuth and elevation.

10 Claims, 5 Drawing Sheets

(56) References Cited

FOREIGN PATENT DOCUMENTS

| CN | 106546892 A | 3/2017 |
|---|---|---|
| CN | 106772328 A | 5/2017 |
| CN | 108169639 A | 6/2018 |
| CN | 108469615 A | 8/2018 |

OTHER PUBLICATIONS

Sep. 5, 2019 Written Opinion of the International Searching Authority issued in International Patent Application No. PCT/CN2018/125446.

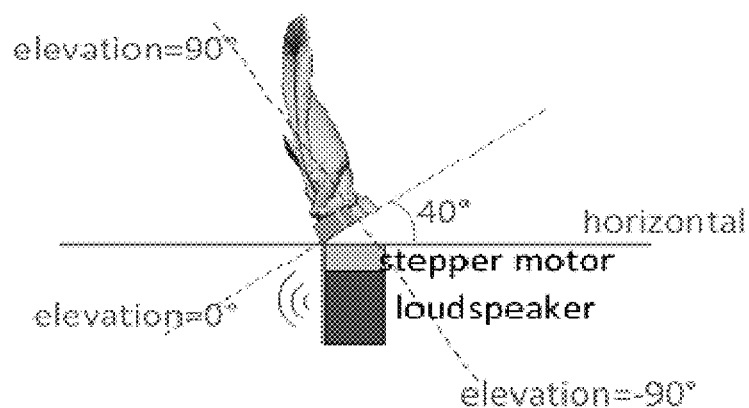
FIG. 3(b)
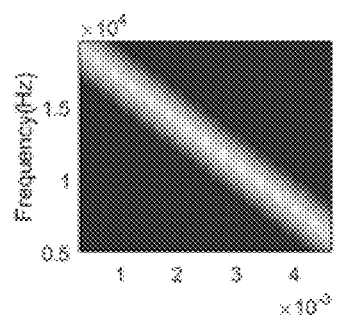 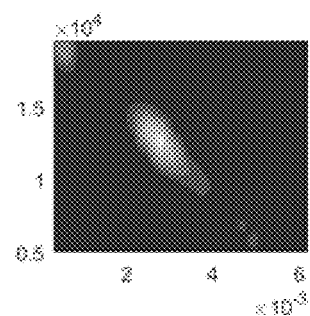 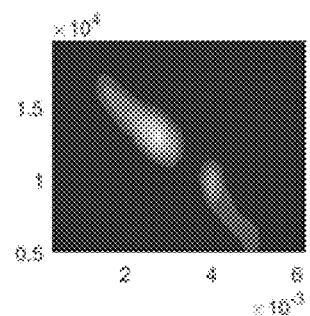
FIG. 4(a)     FIG. 4(b)     FIG. 4(c)
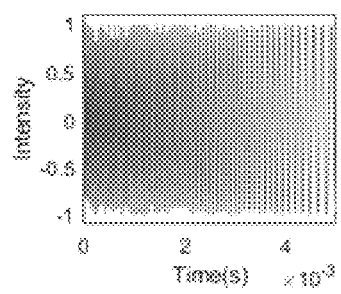 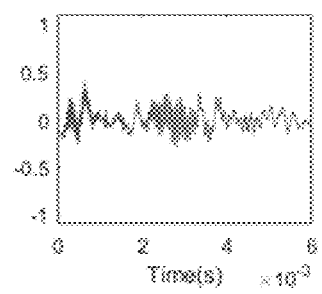 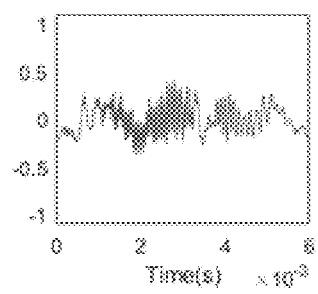
FIG. 4(d)     FIG. 4(e)     FIG. 4(f)

TARGET POSITIONING DEVICE AND METHOD BASED ON PLECOTUS AURITUS DOUBLE-PINNA BIONIC SONAR

TECHNICAL FIELD

This disclosure relates to the field of target positioning, and in particular, to a target positioning device and method based on a plecotus auritus double-pinna bionic sonar.

RELATED ART

The presentation in this section merely improves the background technology related to this disclosure, and does not necessarily constitute the prior art.

In array signal processing of an antenna, if you want to use the antenna to accurately locate an object and take the location of the antenna as an origin, none of three components, namely, an elevation, an azimuth and a distance, is dispensable. The distance may be determined by using a time difference between a transmitted signal and an echo signal, and an algorithm such as time delay estimation or multiple signal classification (MUSIC) can be used to calculate changes of the azimuth. However, the algorithm of the elevation is still to be studied.

Bat sonar gives a bat an ability to move flexibly in dark and complex environments. There are many species of bats, and their ears and nose leaves are different, allowing the bats to obtain location information of an object in space. After long evolution, the nose leaves transmitting bat signals and pinnae receiving echoes have formed an external complex structure adapting to a sonar system. The outer ear of a bat can be equivalent to an acoustic antenna, and the beam of a sound field can be adjusted by merely reflecting the sound of the two outer ears.

Researchers in many countries have made numerous attempts to study the positioning characteristics of the bats. Nowadays, applications based on the acoustic wave positioning technology in the engineering technology have made great progress. Many studies have shown that spatial information of an object can be identified using a broadband acoustic signal similar to that emitted by the bats. Yamada Y et al. studied to detect information about certain locations in space by using a device similar to a bat head, and implement a function of obstacle avoidance. R Müller et al. imitated a dynamic deformation of pinnae of a greater horseshoe bat and designed a bionic intelligent ear. Dieter Vanderelst et al. classified some natural objects and realized a scene recognition function according to features extracted from statistical voice data. Itamar Eliakim designed a vehicle applying an array microphone echo positioning principle, which can automatically collect map information. However, many of the above research experiments only used a binaural time delay method to estimate an azimuth and an ultrasonic ranging principle to estimate a target distance. However, there are not many studies on the accurate judgment of a target orientation by the structure of a single bat ear, and complex information included in echoes received by the bat ear has not been fully utilized either.

SUMMARY

To overcome the shortcoming of the prior art, this disclosure provides a target positioning device and method based on a plecotus auritus double-pinna bionic sonar.

According to a first aspect, this disclosure provides a target positioning device based on a plecotus auritus double-pinna bionic sonar.

The target positioning device based on the plecotus auritus double-pinna bionic sonar includes an ultrasonic transmitter, which transmits an ultrasonic signal; after reflected by a to-be-measured object within a coverage range of the ultrasonic signal transmitted by the ultrasonic transmitter, the ultrasonic signal is received by two ultrasonic receivers installed on the inner bottom of two imitated plecotus auritus pinnae; after received by the two ultrasonic receivers, the received signal is transmitted to a signal collector; the signal collector transmits the collected signals of two microphones to a signal processor after converting an analog signal to a digital signal; and the signal processor extracts a signal time-frequency energy feature from the received digital signal through a short-time Fourier transform, and inputs the time-frequency energy feature into a trained neural network to identify an azimuth and an elevation angle of the to-be-measured object.

The imitated plecotus auritus pinnae include a left bionic pinna and a right bionic pinna; the left bionic pinna is regarded as a left bionic antenna; the right bionic pinna is regarded as a right bionic antenna; the center line of the left bionic antenna is parallel or perpendicular to the center line of the right bionic antenna; the left bionic pinna and the right bionic pinna are printed by a 3D printer after three-dimensional data of plecotus auritus pinnae is obtained by respectively scanning the left and right pinna of a real plecotus auritus; and a print size is n times an pinna size of the real plecotus auritus, and transmitting frequency of the ultrasonic signal is 1/n of real bat frequency.

The imitated plecotus auritus pinnae are fixed on a rotary platform at a forward tilted setting angle, and the rotary platform rotates under the control of a stepper motor; and the stepper motor is controlled by a controller.

The transmitted ultrasonic signal is a linear frequency modulation signal pulse string, and by changing a height and an orientation of the to-be-measured object relative to the ultrasonic receivers, the azimuth and the elevation of the to-be-measured object relative to the ultrasonic receivers are collected when training.

The ultrasonic transmitter is an ultrasonic loudspeaker, and the model of the ultrasonic loudspeaker includes but is not limited to ultra sound gate produced by Avisoft Company.

The ultrasonic receivers are ultrasonic microphones, and the product model of the ultrasonic microphones includes but is not limited to SPU0410LR5H-QB. The model of the signal collector includes but is not limited to a PXIe-6358 signal collection card of National Instrumental Company. The to-be-measured object includes but is not limited to a ball suspended by a line. Positioning characteristics of an imitated plecotus auritus pinna in the elevation direction is measured by controlling a height of the ball when training. Specifically, an orientation of the to-be-measured object can be measured simply by inputting the echo features obtained through the reflection of the to-be-measured object into the trained network. The ball may be replaced with any target whose overall size is far less than a distance from the positioning device to the object.

A frequency bandwidth of a reflected signal is the same as that of a transmitted signal, and system sampling frequency fs is greater than 50 kHz.

The step of extracting a signal energy feature is: extracting frequency information of the reflected signal, and starting from 10 kHz, separately extracting energy in each 1000 Hz frequency range to form an energy feature.

Therefore, in this embodiment of this application, the main section of the device is designed by directly using the shape of two ears of a plecotus auritus and main components of ultrasound used by the plecotus auritus and according to the head structure directly related to a bat sonar, and a plecotus auritus sonar function and the whole process of positioning are directly simulated. On the basis of target positioning of a bat biological sonar system in space, it is now able to accurately locate a single target in three-dimensional space.

According to a second aspect, this disclosure provides a target positioning method based on a plecotus auritus double-pinna bionic sonar.

The target positioning method based on the plecotus auritus double-pinna bionic sonar includes:

step (1): adjusting elevations of imitated plecotus auritus pinnae, and adjusting an angle between a left bionic pinna and a right bionic pinna of the imitated plecotus auritus pinnae, adjusting the ultrasonic transmitter to face the to-be-measured object, and transmitting an ultrasonic signal;

step (2): receiving an echo signal of the ultrasonic signal by ultrasonic receivers respectively installed on the inner bottom of the two left and right imitated plecotus auritus pinnae; and after received by the two ultrasonic receivers, transmitting the received signal to a signal collector;

step (3): transmitting, by the signal collector, the collected signals of two microphones to a signal processor after converting an analog signal to a digital signal; and step (4): extracting, by the signal processor, a signal time-frequency energy feature from the received digital signal through a short-time Fourier transform and inputting the time-frequency energy feature into a trained neural network to identify an estimated azimuth and an estimated elevation of a to-be-measured object.

In a possible implementation, the adjusting an angle between a left bionic pinna and a right bionic pinna of the imitated plecotus auritus pinnae includes:

the angle between the left bionic pinna and the right bionic pinna of the imitated plecotus auritus pinnae is zero, that is, the center line of the left bionic pinna is parallel to the center line of the right bionic pinna; or the angle between the left bionic pinna and the right bionic pinna of the imitated plecotus auritus pinnae is 90°, that is, the center line of the left bionic pinna is perpendicular to the center line of the right bionic pinna.

In a possible implementation, when the center line of the left bionic pinna is perpendicular to the center line of the right bionic pinna, the signal time-frequency energy feature extracted after the two bionic pinnae receive the echo signal in step (4) is input into two neural networks, to respectively obtain a first elevation result and a second elevation result; and because the center line of the left bionic pinna is perpendicular to the center line of the right bionic pinna, the first elevation result and the second elevation result are orthogonal; and that is, space coordinates of the target can be located by merely using the obtained first elevation and second elevation.

In a possible implementation, the transmitted ultrasonic signal is a chirp pulse string signal, each chirp pulse string includes a plurality of chirp pulses of equal intervals, and a single chirp pulse is a linear frequency modulation signal whose frequency decreases from 20 kHz to 5 kHz and lasts for 5 ms.

In a possible implementation, the specific step of extracting the signal time-frequency energy feature from the received digital signal by the signal processor through a short-time Fourier transform is:

dividing the received digital signal into m frames, and after the short-time Fourier transform, obtaining a spectrum of each echo signal; extracting p pieces of spectrum data from each frame area including the echo signal in the spectrum as the energy feature of the echo signal; therefore, the energy feature of the echo signal is finally a two-dimensional feature vector of p*m; and converting the extracted two-dimensional feature vector to a one-dimensional feature vector to obtain an energy sequence of two signals:

left ear: $X=(x_1, x_2, \ldots x_p, x_{p+1}, \ldots, x_{2p}, \ldots, x_{p*m})$; and
right ear: $Y=(y_1, y_2, \ldots, y_p, y_{p+1}, \ldots, y_{2p}, \ldots, y_{p*m})$.

In a possible implementation, steps of training the neural network are:

A ten-fold cross-validation method is used to evaluate the trained neural network: dividing all features into 10 sub-feature sets, where each sub-feature set includes all features of collected data; setting 9 sub-feature sets as training sets, and the remaining sub-feature set as a test set; separately performing the validation for 10 times to test the reliability of angle estimations of the neural network;

inputting data features in training sets into the neural network to train the neural network; setting a time-frequency energy sequence of two signals as an input value of the neural network, and performing neural network training by using azimuths and elevations of targets whose azimuths are known in space as labels;

inputting data features in test sets into the neural network to test a classification accuracy of the neural network; and when the classification accuracy reaches a setting threshold, stopping the training and obtaining the trained neural network.

In a possible implementation, the specific step of inputting the time-frequency energy feature into a trained neural network to identify an azimuth and an elevation of the to-be-measured object:

setting a time-frequency energy sequence of two signals as an input value of the trained neural network, and outputting, by the neural network, the azimuth and elevation of the target.

In a possible implementation, the target positioning method based on the plecotus auritus double-pinna bionic sonar further includes:

step (5): processing, by using a sliding window counting average (SWCA) method, the estimated azimuth and the estimated elevation of the to-be-measured object that are obtained at step (4), so as to gain a precise azimuth and a precise elevation; or processing, by using a sliding window accumulation method, the estimated azimuth and the estimated elevation of the to-be-measured object that are obtained at step (4), so as to gain a precise azimuth and a precise elevation.

In a possible implementation, specific steps of the sliding window counting average method are:

after each pulse obtains an estimated azimuth and an estimated elevation of a single pulse, performing final angle estimation by using a sliding window, and in terms of N estimated values, performing sliding on a setting range of angles by using a first-level sliding window of length L, where a step length is half of a window length, the starting location of the sliding window corresponds to the minimum in the N estimated values, and the end location of the sliding window corresponds to the maximum in the N estimated values;

taking an angle at the midpoint of a sliding window into which the most estimated angle values of a single pulse fall as a result;

when estimated angles falling into a plurality of sliding windows are all the most, taking the average value of a left boundary of the left-most window and a right boundary of the right-most window of all sliding windows that each include the most pulses as the median of a result window;

after the first-level sliding search, forming, by a next-level search, a new search range by using a sliding window of length L/2 in an angle range obtained by a previous-level search, and continuing searching until the search is completed; and setting the angle in the finally obtained sliding window as a precise value of a pulse string angle.

In a possible implementation, specific steps of the sliding window accumulation method are:

performing final angle estimation by using a sliding window, and in terms of N estimated values, performing sliding on a setting range of angles by using a first-level sliding window of length L, where the starting location of a sliding window corresponds to the minimum in N initial estimated values, the end location of the sliding window corresponds to the maximum in the N initial estimated values, and a step length is 1;

all integer angles covered by the sliding window each correspond to a y value that is initially 0, and the y value is used to calculate an accumulation value of the pulse at a current angle;

if an estimated value of a pulse is inside a window, increasing a y value of each angle covered by the sliding window by 1; after the window finishes sliding, counting the angle with the largest y value as the optimal angle;

if there is a plurality of angles with the largest y value, taking the average value of these angles with the largest y value as a result, wherein the result is the estimated value of the first-level sliding window;

after the first-level sliding search, forming, by a next-level search, a new search range by using a sliding window of length L/2 in an angle range obtained by a previous-level search, and continuing searching until the search is completed; and setting the angle in the finally obtained sliding window as a precise value of a pulse string angle.

To obtain more precise estimation, a second-order window of length L/2 and a third-order window of length L/4 may be further added.

Compared with the prior art, beneficial effects of this disclosure are as follows:

1. An echo positioning device based on bionic pinnae of a bat according to the present invention can determine an azimuth and an elevation of a target to locate the spatial location of the target by using echoes obtained by two array elements, resolving a problem that two array element antennas cannot locate the space coordinates.

2. In a positioning method based on bionic pinnae of a bat according to the present invention, according to filtering characteristics of bat ears, a method for estimating a spatial location by a neural network is used, and a pulse string estimation method is used to reduce the error of estimated angles, to obtain a precise azimuth and elevation.

3. In a positioning method based on bionic pinnae of a bat according to the present invention, coordinate positioning of a target in space can be implemented by merely using elevation characteristics of two pinnae.

BRIEF DESCRIPTION OF THE DRAWINGS

The accompanying drawings of the specification constitute a part of this application and provide a further understanding of this application, and the schematic embodiments of this application and their descriptions are used to explain this application, but are not intended to improperly limit this application.

FIG. 3(a) and FIG. 3(b) are a schematic diagram of a spherical coordinate system and a side view of the signal collection device according to the present invention;

FIG. 4(a) to FIG. 4(f) are a spectrogram and a time domain diagram of a transmitted signal of an ultrasonic loudspeaker and a signal received by left and right pinnae;

DETAILED DESCRIPTION

It is to be noted that all the following detailed descriptions are exemplary and are intended to provide further explanation of this application. Unless defined otherwise, all technical and scientific terms used herein have the same meaning as commonly understood by one of ordinary skill in the art to which this application belongs.

It should be noted that the terminology used herein is for the purpose of describing particular embodiments only but is not intended to be limiting of exemplary embodiments according to this application. The expression in the singular form in this specification will cover the expression in the plural form unless otherwise indicated obviously from the context, and moreover, it will be further understood that the terms "comprises", "includes", "comprising" and/or "including", when used in this specification, specify the presence of features, steps, operations, devices, components and/or groups thereof.

The present invention merely uses the shape of two ears of a plecotus auritus to determine a target location.

A plecotus auritus is an FM bat that can emit a 25 kHz to 65 kHz frequency modulation signal. A study of the team of the present invention indicates that the facial structure of the plecotus auritus is not as complex as that of other species of bats such as a greater horseshoe bat. However, the plecotus auritus has a more complex pinna structure. In a range of 30 kHz to 50 kHz, energy of beams received by an ear model of the plecotus auritusat each frequency has a certain correspondence with each of an elevation and an azimuth of an incoming wave. Therefore, the outer ear structure of the plecotus auritus may be used as a signal receiving antenna to perform filtering and amplification processing on acoustic waves from various elevations. Therefore, an elevation and an azimuth may be determined by using energy distribution of a frequency sweep signal received by the outer ears of the plecotus auritus. Accordingly, the present invention merely uses the shape of the two ears of the plecotus auritus to determine the target location.

Figure 1:
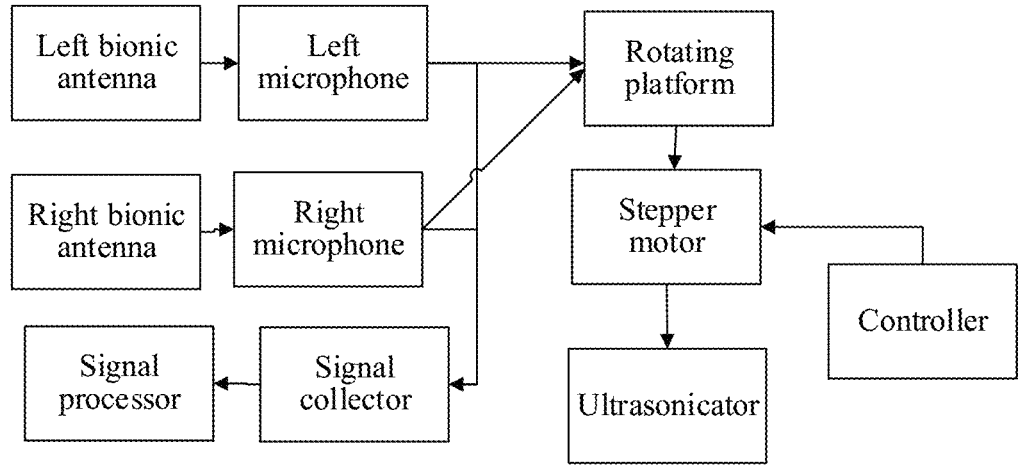
FIG. 1 is a hardware connection relationship diagram of a signal collection device according to the present invention.

As shown in FIG. 1, a positioning device based on a bionic sonar of a bat includes: an ultrasonic transmitter, which transmits an ultrasonic signal; after reflected by a to-be-measured object within a coverage range of the ultrasonic signal transmitted by the ultrasonic transmitter, the ultrasonic signal is received by two ultrasonic receivers installed on the inner bottom of two imitated plecotus auritus pinnae; after received by the two ultrasonic receivers, the received signal is sent to a signal collector; the signal collector sends the collected signals of two microphones to a signal processor after converting an analog signal to a digital signal; and the signal processor extracts a signal time-frequency energy feature from the received digital signal through a short-time Fourier transform, and inputs the time-frequency energy feature into a trained neural network to identify an azimuth and an elevation of the to-be-measured object.

Figure 2A:
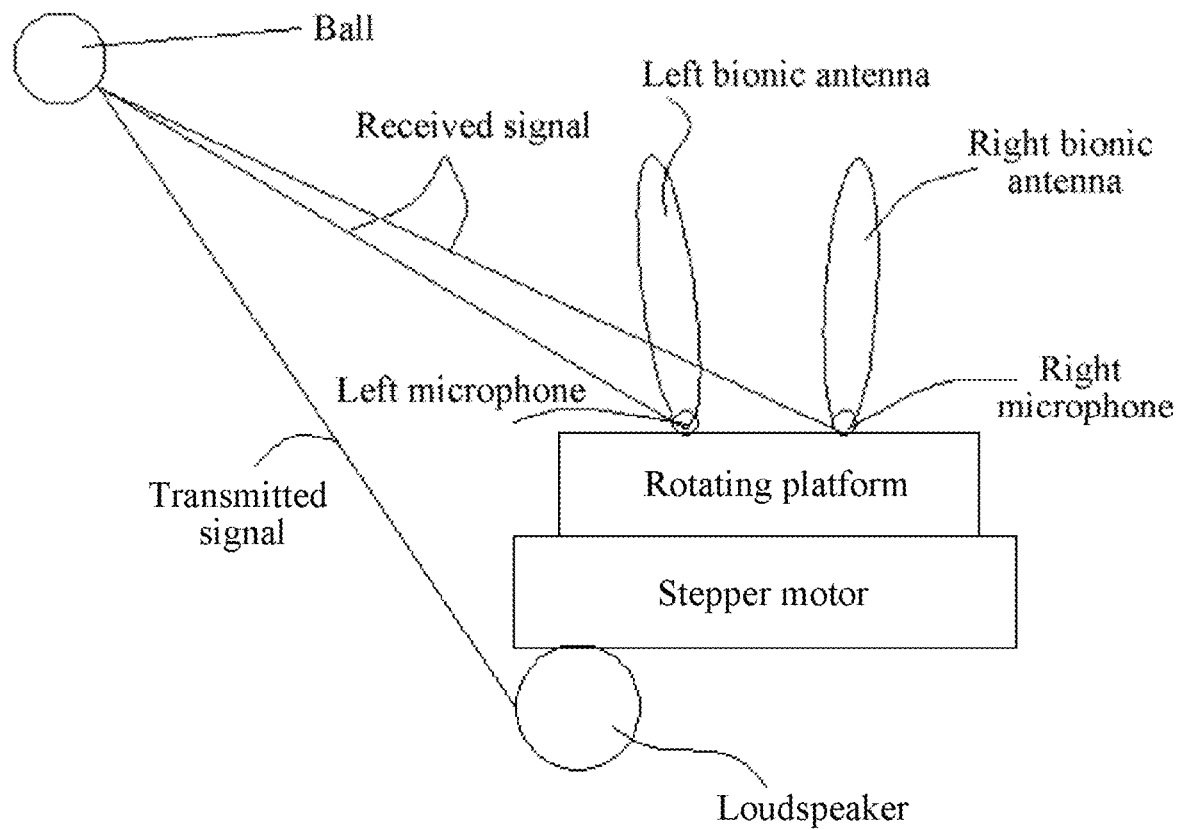
FIG. 2(a) and FIG. 2(b) are schematic diagrams of a mechanical connection of a signal collection device according to the present invention.
Figure 2B:
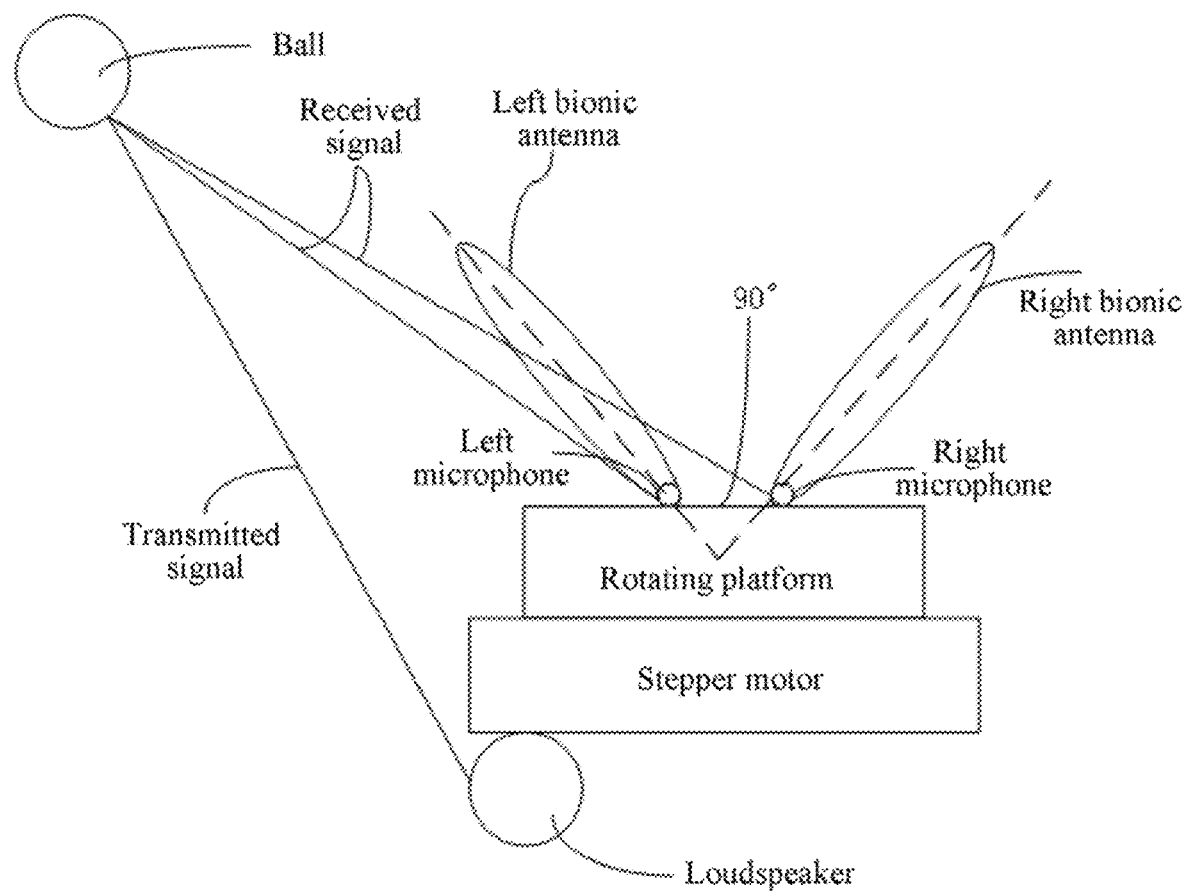

The two imitated plecotus auritus pinnae include a left bionic pinna and a right bionic pinna; the left bionic pinna is regarded as a left bionic antenna; the right bionic pinna is regarded as a right bionic antenna; as shown in FIG. 2(a), the center line of the left bionic antenna is parallel to the center line of the right bionic antenna, or as shown in FIG. 2(b), the center line of the left bionic antenna is perpendicular to the center line of the right bionic antenna.

The two ultrasonic receivers are respectively a left microphone and a right microphone.

Figure 3A:
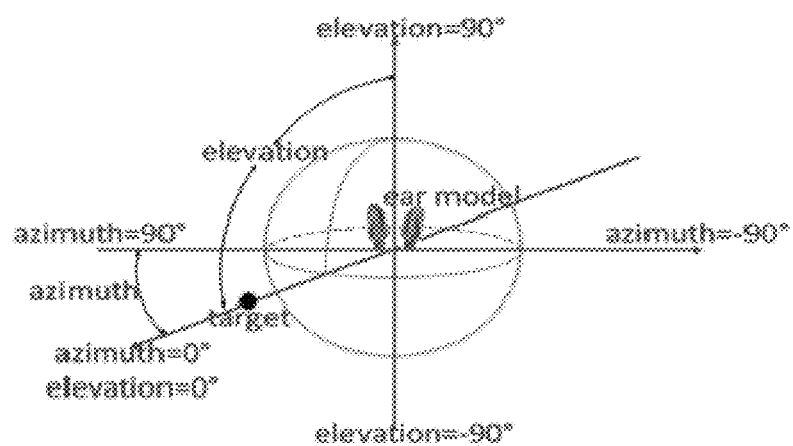

FIG. 3(a) and FIG. 3(b) are a schematic diagram of a spherical coordinate system and a side view of the signal collection device according to the present invention.

The imitated plecotus auritus pinnae can be implemented by a 3D printer, that is, three-dimensional data of plecotus auritus pinnae may be obtained by three-dimensionally scanning pinnae of a real plecotus auritus and then the imitated plecotus auritus pinnae are printed by a 3D printer. A real print size may be n times a pinna size of the real plecotus auritus. However, transmitting frequency should be reduced to 1/n of real bat frequency. For example, we can learn that the ears of the plecotus auritus have frequency scanning characteristics ranging from 30 to 45 kHz. According to a scale model principle, this experiment used an ear model that is 3 times the original size, so that an effective frequency range of the transmitted signal may be calculated as 10 to 15 kHz.

An ultrasonic transmitter: the ultrasonic transmitter is used to implement ultrasonic transmitting, and the transmitter may transmit an ultrasonic signal equivalent to a pinna size. In this experiment, the effective frequency range of the transmitted signal is 10 to 15 kHz, and a frequency range of the transmitted signal is adjusted to 5 to 20 kHz.

The signal collector is used to collect an ultrasonic reflection signal reflected by a target ahead, where a frequency bandwidth of the reflected signal is the same as that of the transmitted signal, and system sampling frequency fs should be greater than 50 kHz. The signal collector converts a collected analog signal to a digital signal, and sends the digital signal to the signal processor.

The signal processor extracts frequency information of a reflected signal, that is, starting from 10 kHz, separately extracts energy in each 1000 Hz frequency range to form a parameter vector as an input of the neural network. A neural network algorithm is also completed by the signal processor. An output result is obtained by the calculation of the neural network algorithm, that is, an azimuth and an elevation of the target.

Bat ears used in this experiment are models that are printed by a 3D printer and are 3 times the original ears. The two models are taken from a mirror image of ear models of the same plecotus auritus. An ultrasonic microphone is put at the bottom of an ear, and is fixed on a rotating platform. To prevent an acoustic wave from entering the microphone from the bottom of the model, the ear models lean forward by 40 degrees. A stepper motor is at the bottom of the rotating platform, which facilitates the rotation of the two ears, so as to measure positioning information on the azimuth. An ultrasonic loudspeaker is at the bottom of the stepper motor, when training, the to-be-measured object is a ball suspended by a line. Positioning characteristics of an ear model in the elevation direction may be measured by controlling a height of the ball.

The model of the ultrasonic loudspeaker is ultra sound gate produced by Avisoft Company. The model of the signal collector is a PXIe-6358 signal collection card of National Instrumental Company. The product model of the microphone is SPU0410LR5H-QB, and the model of the stepper motor is 42BYGH34.

An azimuth and an elevation of an object relative to a positioning device are changed, and a linear frequency modulation signal pulse string is transmitted. An echo signal is collected by the signal collector and the echo signal is stored in the signal processor.

The signal processor performs a short-time Fourier transform on the received echo signal to form a parameter vector as an input of the neural network.

Features extracted by neural network training are used to obtain the azimuth and the elevation of the target.

A method for performing positioning by using the above device includes the following steps:

In addition to obtaining estimated values of an azimuth and an elevation of a target by using an algorithm based on a neural network, to improve accuracy, a transmitted ultrasonic signal is a chirp pulse string signal. Each chirp pulse string includes a plurality of chirp pulses of equal intervals, and a single pulse is a linear frequency modulation signal whose frequency decreases from 20 kHz to 5 kHz and lasts for 5 ms.

An ultrasonic transmitter transmits a pulse string signal, and after reflected by a target, the pulse string signal passes through models of two bat ears and is received by a collector. After a short-time Fourier transform is performed on an echo signal, an amplitude-frequency variation rule in each frame of sound frequency domains can be obtained. The diagonal area of the spectrogram of the received 5 ms echo signal is divided into 20 frames. Each frame is divided into 30 values as narrow-band frequency features, so that the total feature of the echo signal is a 30×20 vector.

Sectional energy values of the diagonal area are taken as parameters to form short-time energy parameter sequences of two signals:

left ear: $X=(x_1, x_2, \ldots x_p, x_{p+1}, \ldots, x_{2p}, \ldots, x_{p*m})$; and
right ear: $Y=(y_1, y_2, \ldots, y_p, y_{p+1}, \ldots, y_{2p}, \ldots, y_{p*m})$.

Using an azimuth and an elevation of a single target object in space as labels, the two sequences are taken as inputs to train a neural network, where the neural network can be either a conventional BP neural network or a deep neural network.

A ten-fold cross-validation method is used to perform neural network training. All features used in the experiment are divided into 10 sub-feature sets, and each sub-feature set includes all features of collected data from the four locations in the laboratory. 9 sub-feature sets are taken as training sets, and the remaining sub-feature set is taken as a test set. The reliability of angle estimations of the neural network is tested by separately performing the validation for 10 times.

The trained neural network may be used to determine a single target orientation, and the specific steps are the same as those described above. That is, the left ear and the right ear receive echoes that are reflected by the single target, the echoes form two short-time energy parameter sequences as inputs of the neural network, and the neural network may automatically output the azimuth and the elevation of the target.

The experiment found that compared with real values, errors of results obtained by using a single frequency modulation signal shown in FIG. 4(a) to FIG. 4(f) to perform target identification are mostly within a range of ±5 degrees. An angle estimated value of an azimuth and an elevation may be definitely obtained by each single pulse. When there are many pulses in a pulse string, a k-mean cluster may be adopted. However, as there are few pulses, a sliding window search method with changed window length is adopted, and the sliding window is used to search for angle estimated values obtained by each frequency modulation pulse in the pulse string to finally obtain a relatively precise azimuth and elevation.

For each single pulse signal in the pulse string, estimated values of the azimuth and the elevation are obtained by using the above steps, and there are N pulses in the pulse string, so that results are N estimated values. To obtain more precise estimated values by using these results, the present invention uses two estimation methods of a sliding window with changed window length. The methods are as follows.

The descriptions of a sliding window search method with changed window length are as follows:
Sliding Window Counting Average Method After each pulse obtains a single pulse estimated angle, a sliding window is used to perform final angle estimation. According to a statistic result of the single pulse, compared with real values, errors of most single pulse angle estimated values are mostly within a range of ±5 degrees. In terms of N initial estimated values, a first-level sliding window of length L is used to perform sliding on a setting range of elevations, where a step length is half of a window length, the starting location of the sliding window corresponds to the minimum in the N initial estimated values, and the end location of the sliding window corresponds to the maximum in the N initial estimated values. An angle at the midpoint of a window into which the most estimated angle values of a single pulse fall is taken as a result. When estimated angles falling into a plurality of sliding windows are all the most, the average value of a left boundary of the left-most window and a right boundary of the right-most window of a plurality of sliding windows that each include the most pulses is taken as the median of a result window. After the first-level sliding search, a second-level search and a tertiary search use a sliding window of length L/2 to form a new search range in an angle range obtained by a previous-level search until the search is completed. The angle in the finally obtained sliding window is set as an estimated value of a pulse string angle.
Sliding Window Accumulation Method The starting location of a sliding window corresponds to the minimum in N initial estimated values, and the end location of the sliding window corresponds to the maximum in the N initial estimated values, where a step length is 1°. All integer angles covered by the sliding window each correspond to a y value that is initially 0, which is used to calculate an accumulation value of the pulse at a current angle. If an initial estimated value of a pulse is inside a window, a y value of each angle covered by the window increases by 1. After the window finishes sliding, the angle with the largest y value is counted as the optimal angle. If there is a plurality of angles with the largest y value, the average value of these angles is taken as a result, and the result is the estimated value of the first-level sliding window. To obtain more precise estimation, a second-order window of length L/2 and a third-order window of length L/4 may be further added. The experimental results indicate that an identification rate is obviously improved by using a pulse string method compared with a single pulse method, implementing a function of precisely detecting angles.

The experimental results indicate that, for bat ears, positioning characteristics on an elevation are much better than positioning characteristics on an azimuth. An angle between two ears of an echo positioning device based on bionic ears of a bat is modified to make the two ears perpendicular to each other. Features extracted after the two ears receive an echo are respectively input into two neural networks and two elevation results are obtained. As the two ears are perpendicular to each other, the two elevation results are mutual orthogonal azimuth characteristics. A function of precisely detecting a target in space can be implemented.

In FIG. 4(a) to FIG. 4(f), different gray scales of spectrograms indicate different intensity of signals at this position, where three spectrograms respectively represent a transmitted signal of a loudspeaker, and signals received by left and right ear microphones. It can be seen from the comparison in the figures that after the signal transmitted by the loudspeaker passes through the ear models, different frequency energy distribution changes, which represents that the ear models have a certain filtering function.

Figure 5:
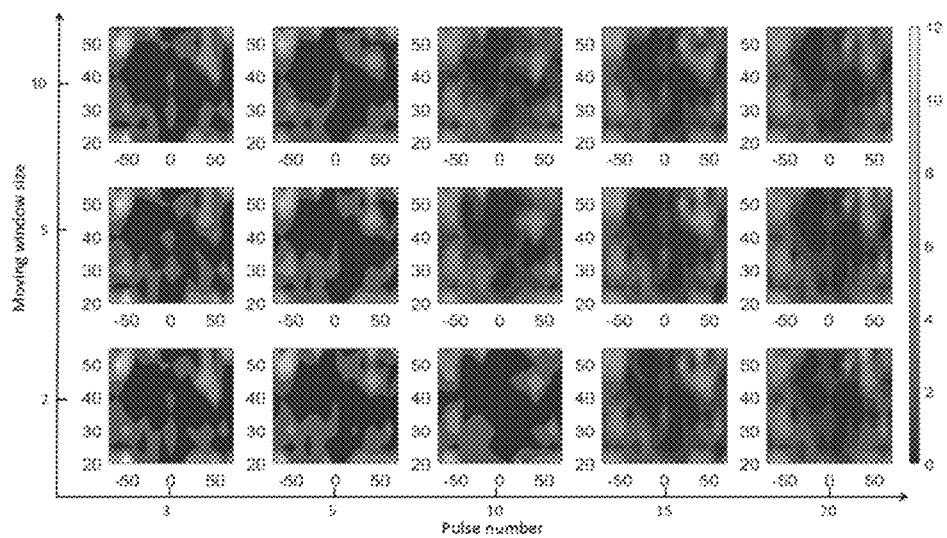
FIG. 5 is a diagram of errors between elevation estimations and real angles by changing pulse numbers in pulse strings and using different tertiary sliding windows.
Figure 7:
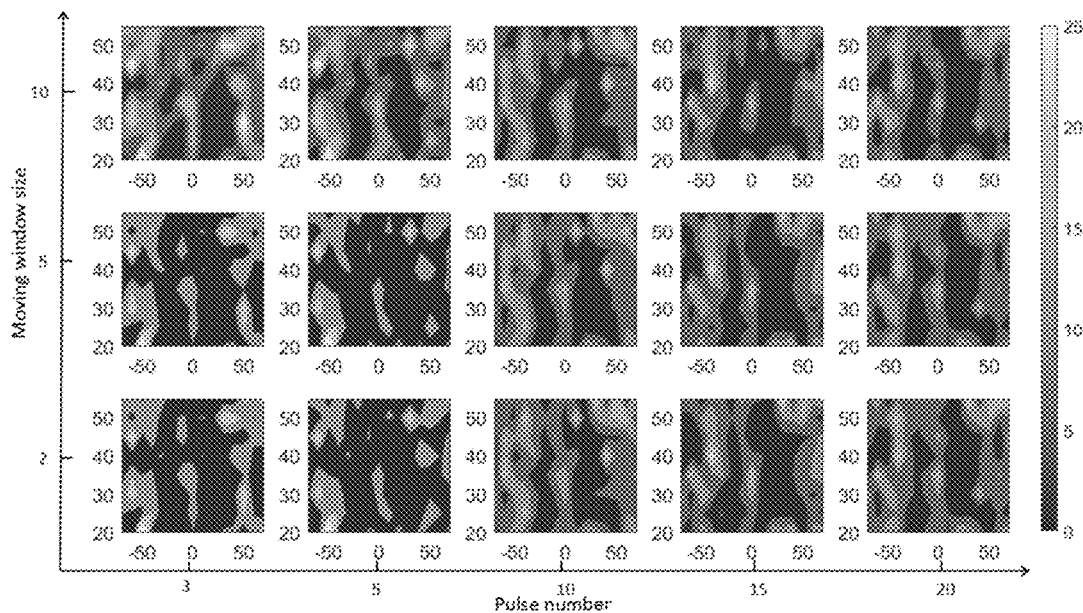
FIG. 7 is a diagram of errors between azimuth estimations and real angles by changing pulse numbers in pulse strings and using different tertiary sliding windows when the center line of the double-pinna is parallel or perpendicular.

FIG. 5 and FIG. 7 respectively show an elevation estimation error and an azimuth estimation error. The horizontal axis is the quantity of different pulses in a pulse string, and the longitudinal axis is sizes of different sliding windows. The horizontal axis and the longitudinal axis in the small figures respectively represent azimuths and elevations. The azimuths during training are limited to −70° to +70°, and the range of the elevations is 20° to 55°. It can be seen from FIG. 7 that when the azimuth is within 30°, an error obtained by measuring a pulse string is very small. As the quantity of pulses in the pulse string increases, the maximum of the error may decrease, which indicates that estimated angles become more and more stable.

Different thresholds are used to perform error determination. When the error is lower than a certain threshold, it is considered that the current angle estimation is correct. This threshold is referred to as an error angle. Different identification rate curves can be obtained by changing error angles, azimuth limitation angles, and the quantity of pulses.

Figure 6A:
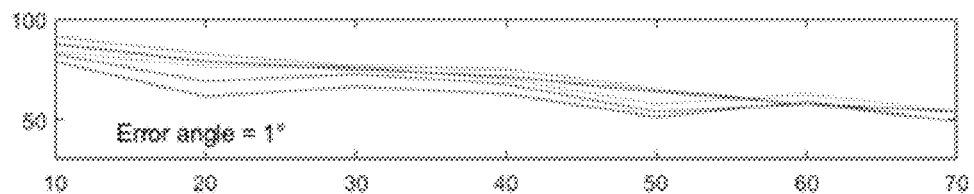
FIG. 6(a) to FIG. 6(c) show elevation identification rates estimated by using a pulse string method with different error angles, different pulse numbers, and changes of an azimuth limiting angle when the center line of the double-pinna is parallel or perpendicular.
Figure 6B:
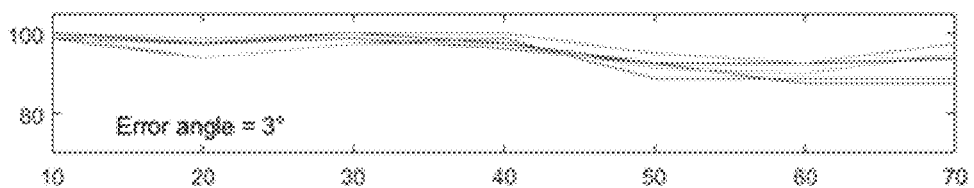
Figure 6C:
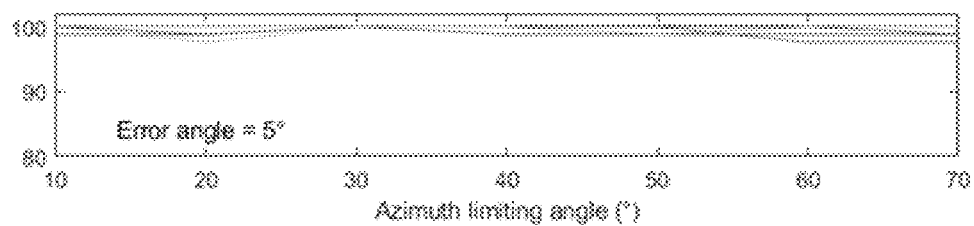

In FIG. 6(a) to FIG. 6(c), three curve graphs respectively show elevation pulse string identification rates under different azimuth limitation angles when elevation errors are 1 degree, 3 degrees, and 5 degrees. It can be seen from the figures that when the error is 5 degrees, all the angle estimation results are quite accurate, and the accuracy rates are all above 95%. It indicates that when an error between an angle tested by a neural network and a real angle is within 5 degrees, the multi-pulse accuracy rate is very high. When the elevation errors are 1 degree and 3 degrees, the multi-pulse determination also behaves well. When the azimuth limitation angle increases, the identification accuracy rate may decrease. In addition, the quantity of the pulses in the pulse string may also affect the identification rate.

Figure 8:
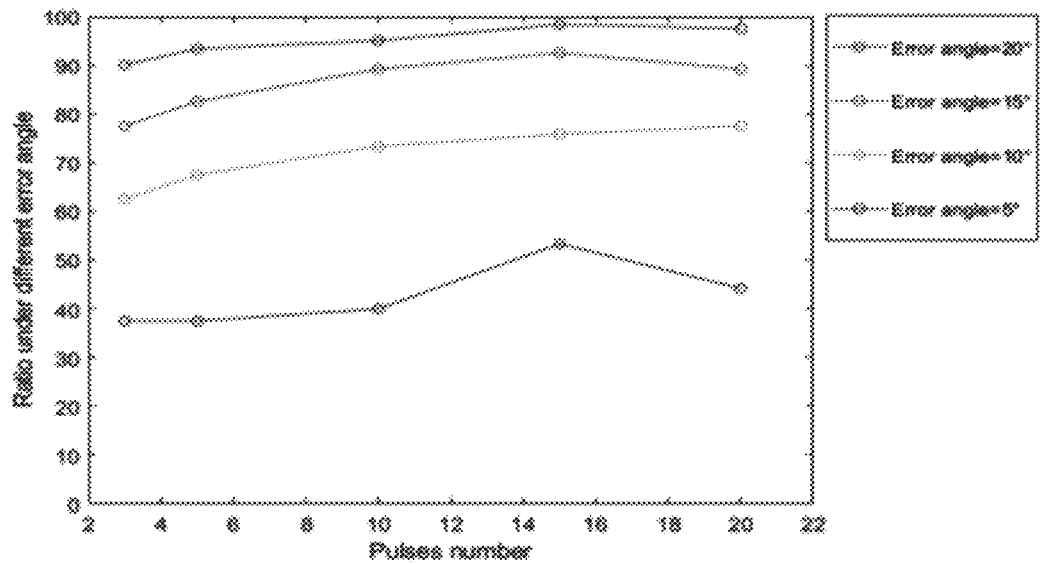
FIG. 8 shows azimuth identification rates estimated by using a pulse string method with different error angles and different pulse numbers when the center line of the double-pinna is parallel or perpendicular.

In FIG. 8, the curve graph represents the azimuth pulse string identification rate of changing pulse numbers under different azimuth errors. When the error is above 15 degrees, azimuth estimation values are relatively accurate, and the accuracy rates are above 80%. When the quantity of pluses increases, the identification rate may also increase.

FIG. 6(a) to FIG. 6(f) and FIG. 8 represent multi-pulse identification rates of the elevations and the azimuths. It can be seen that when the quantity of the pulses in the pulse string increases, the identification rate may also increase. However, the identification ability of the azimuth is worse than the identification ability of the elevation. The identification rate of a method for identifying angles by using a plurality of pulses is much higher than that for identifying angles by using a single pulse.

The above is only preferred embodiments of this application, and it is not used to limit this application. For those skilled in the art, this application may have various modifications and changes. Any modification, equivalent replacement and improvement within the spirits and principles of this application are still in the protection scope of this application.

What is claimed is:

1. A target positioning method based on a plecotus *auritus* double-pinna bionic sonar, comprising:
   step (1): adjusting elevations of imitated plecotus *auritus* pinnae, and adjusting an angle between a left bionic pinna and a right bionic pinna of the imitated plecotus *auritus* pinnae, adjusting an ultrasonic transmitter to face a to-be-measured object, and transmitting an ultrasonic signal;
   step (2): receiving an echo signal of the ultrasonic signal by two ultrasonic receivers respectively installed on an inner bottom of the left and the right bionic pinnae, each of the two ultrasonic receivers being a microphone; after being received by the two ultrasonic receivers, transmitting the received echo signal to a signal collector;
   step (3): transmitting, by the signal collector, the echo signal from the two microphones to a signal processor after converting the echo signal from an analog signal to a digital signal; and
   step (4): extracting, by the signal processor, a signal time-frequency energy feature from the digital signal through a short-time Fourier transform, and inputting a time-frequency energy feature into a trained neural network to identify an estimated azimuth and an estimated elevation of the to-be-measured object wherein,
   the extracting, by the signal processor, of the signal time-frequency energy feature from the echo signal through the short-time Fourier transform is:
      dividing the digital signal into m frames, and after the short-time Fourier transform, obtaining a spectrum of each echo signal;
      extracting p pieces of spectrum data from each frame area comprising the echo signal in the spectrum as the time-frequency energy feature of the echo signal; the time-frequency energy feature of the echo signal being a two-dimensional feature vector of p*m; and
      converting the extracted two-dimensional feature vector to a one-dimensional feature vector to obtain an energy sequence of two signals:
      left ear: $X=(x_1, x_2, \ldots x_p, x_{p+1}, \ldots, x_{2p}, \ldots, x_{p*m})$; and
      right ear: $Y=(y_1, y_2, \ldots, y_p, y_{p+1}, \ldots, y_{2p}, \ldots, y_{p*m})$.

2. The method according to claim 1, wherein the transmitted ultrasonic signal is a chirp pulse string signal, each chirp pulse string comprises a plurality of chirp pulses of equal intervals, and a single chirp pulse is a linear frequency modulation signal whose frequency decreases from 60/n kHz to 20/n kHz and lasts for 5 ms.

3. The method according to claim 1, wherein steps of training the neural network are:
   inputting data features in training sets into the neural network to train the neural network; setting an energy sequence of two signals as an input value of the neural network, and performing neural network training by using a known azimuth and a known elevation of the to-be-measured object in space as labels;
   inputting data features in test sets into the neural network to test a classification accuracy of the neural network; and
   when the classification accuracy reaches a setting threshold, stopping the training and obtaining the trained neural network.

4. The method according to claim 1, wherein,
   the inputting of the time-frequency energy feature into the trained neural network to identify the estimated azimuth and the estimated elevation of the to-be-measured object is:
   setting an energy sequence of two signals as the time-frequency energy feature input into the trained neural network, and outputting, by the trained neural network, the estimated azimuth and the estimated elevation of the to-be-measured object.

5. The method according to claim 1, further comprising:
   step (5): processing, by using a sliding window counting average method, the estimated azimuth and the estimated elevation of the to-be-measured object that are obtained at step (4), so as to gain a precise azimuth and a precise elevation; or
   processing, by using a sliding window accumulation method, the estimated azimuth and the estimated elevation of the to-be-measured object that are obtained at step (4), so as to gain the precise azimuth and the precise elevation.

6. A target positioning method based on a plecotus *auritus* double-pinna bionic sonar, comprising:
   step (1): adjusting elevations of imitated plecotus *auritus* pinnae, and adjusting an angle between a left bionic pinna and a right bionic pinna of the imitated plecotus *auritus* pinnae, adjusting an ultrasonic transmitter to face a to-be-measured object, and transmitting an ultrasonic signal;
   step (2): receiving an echo signal of the ultrasonic signal by two ultrasonic receivers respectively installed on an inner bottom of the left and the right bionic pinnae, each of the two ultrasonic receivers being a microphone; after being received by the two ultrasonic receivers, transmitting the received echo signal to a signal collector;
   step (3): transmitting, by the signal collector, the echo signal from the two microphones to a signal processor after converting the echo signal from an analog signal to a digital signal;
   step (4): extracting, by the signal processor, a signal time-frequency energy feature from the digital signal through a short-time Fourier transform, and inputting a time-frequency energy feature into a trained neural network to identify an estimated azimuth and an estimated elevation of the to-be-measured object; and step (5): processing, by using a sliding window counting average method, the estimated azimuth and the estimated elevation of the to-be-measured object that are obtained at step (4), so as to gain a precise azimuth and a precise elevation; or processing, by using a sliding window accumulation method, the estimated azimuth and the estimated elevation of the to-be-measured object that are obtained at step (4), so as to gain the precise azimuth and the precise elevation, wherein specific steps of the sliding window counting average method are:

after an estimated azimuth and an estimated elevation are obtained for each of a plurality of pulses, performing final angle estimation by using a sliding window, and in terms of N estimated values, performing sliding on a setting range of angles by using a first-level sliding window of length L, wherein a step length is half of the length of the window, the starting location of the sliding window corresponds to the minimum in the N estimated values, and the end location of the sliding window corresponds to the maximum in the N estimated values;

taking an angle at the midpoint of the sliding window into which the most estimated angle values of respective pulse fall as a result;

when a number of estimated angles falling into a plurality of the sliding windows are all the highest of the numbers of estimated angles, taking an average value of a left boundary of a left-most window and a right boundary of a right-most window of the plurality of the sliding windows that each comprise the highest of the numbers of estimated angles as the median of a result window;

after the first-level sliding search, forming, by a next-level search, a new search range by using a sliding window of length L/2 in an angle range obtained by a previous-level search, and continuing searching until the next-level search is completed; and setting the angle in the finally obtained sliding window as a precise value of a pulse string angle.

7. A target positioning method based on a plecotus *auritus* double-pinna bionic sonar, comprising:

step (1): adjusting elevations of imitated plecotus *auritus* pinnae, and adjusting an angle between a left bionic pinna and a right bionic pinna of the imitated plecotus *auritus* pinnae, adjusting an ultrasonic transmitter to face a to-be-measured object, and transmitting an ultrasonic signal;

step (2): receiving an echo signal of the ultrasonic signal by two ultrasonic receivers respectively installed on an inner bottom of the left and the right bionic pinnae, each of the two ultrasonic receivers being a microphone; after being received by the two ultrasonic receivers, transmitting the received echo signal to a signal collector;

step (3): transmitting, by the signal collector, the echo signal from the two microphones to a signal processor after converting the echo signal from an analog signal to a digital signal;

step (4): extracting, by the signal processor, a signal time-frequency energy feature from the digital signal through a short-time Fourier transform, and inputting a time-frequency energy feature into a trained neural network to identify an estimated azimuth and an estimated elevation of the to-be-measured object; and step (5): processing, by using a sliding window counting average method, the estimated azimuth and the estimated elevation of the to-be-measured object that are obtained at step (4), so as to gain a precise azimuth and a precise elevation; or processing, by using a sliding window accumulation method, the estimated azimuth and the estimated elevation of the to-be-measured object that are obtained at step (4), so as to gain the precise azimuth and the precise elevation, wherein specific steps of the sliding window accumulation method are:

performing final angle estimation by using a sliding window, and in terms of N estimated values, performing sliding on a setting range of angles by using a first-level sliding window of length L, wherein the starting location of the sliding window corresponds to the minimum in N initial estimated values, the end location of the sliding window corresponds to the maximum in the N initial estimated values, and a step length is 1°;

all integer angles covered by the sliding window each correspond to a y value that is initially 0, and the y value is used to calculate an accumulation value of a pulse at a current angle;

if an estimated value of the pulse is inside the sliding window, increasing the y value of each angle covered by the sliding window by 1; after the sliding window finishes sliding, counting the angle with the largest y value as an optimal angle;

if there is a plurality of angles with the largest y value, taking an average value of the plurality of the angles with the largest y value as a result, wherein the result is an estimated value of the first-level sliding window;

after the first-level sliding search, forming, by a next-level search, a new search range by using a sliding window of length L/2 in an angle range obtained by a previous-level search, and continuing searching until the next-level search is completed; and setting the angle in the finally obtained sliding window as a precise value of a pulse string angle.

8. The method according to claim 1, wherein a coordinate system used when the method identifies the estimated azimuth and the estimated elevation of the to-be-measured object comprises but is not limited to a rectangular coordinate system, a spherical coordinate system, and a cylindrical coordinate system.

9. The method according to claim 1, wherein the adjusting of the angle between the left bionic pinna and the right bionic pinna of the imitated plecotus *auritus* pinnae comprises:

adjusting the angle between the left bionic pinna and the right bionic pinna of the imitated plecotus *auritus* pinnae to be zero, such that a center line of the left bionic pinna is adjusted to be parallel to a center line of the right bionic pinna; or adjusting the angle between the left bionic pinna and the right bionic pinna of the imitated plecotus *auritus* pinnae to be 90°, such that the center line of the left bionic pinna is adjusted to be perpendicular to the center line of the right bionic pinna.

10. A target positioning method based on a plecotus *auritus* double-pinna bionic sonar, comprising:

step (1): adjusting elevations of imitated plecotus *auritus* pinnae, and adjusting an angle between a left bionic pinna and a right bionic pinna of the imitated plecotus

*auritus* pinnae, adjusting an ultrasonic transmitter to face a to-be-measured object, and transmitting an ultrasonic signal;

step (2): receiving an echo signal of the ultrasonic signal by two ultrasonic receivers respectively installed on an inner bottom of the left and the right bionic pinnae, each of the two ultrasonic receivers being a microphone; after being received by the two ultrasonic receivers, transmitting the received echo signal to a signal collector;

step (3): transmitting, by the signal collector, the echo signal from the two microphones to a signal processor after converting the echo signal from an analog signal to a digital signal; and step (4): extracting, by the signal processor, a signal time-frequency energy feature from the digital signal through a short-time Fourier transform, and inputting a time-frequency energy feature into a trained neural network to identify an estimated azimuth and an estimated elevation of the to-be-measured object, wherein the adjusting of the angle between the left bionic pinna and the right bionic pinna of the imitated plecotus *auritus* pinnae comprises:

adjusting the angle between the left bionic pinna and the right bionic pinna of the imitated plecotus *auritus* pinnae to be zero, that is, a center line of the left bionic pinna is adjusted to be parallel to a center line of the right bionic pinna; or adjusting the angle between the left bionic pinna and the right bionic pinna of the imitated plecotus *auritus* pinnae to be 90°, that is, the center line of the left bionic pinna is adjusted to be perpendicular to the center line of the right bionic pinna;

when the center line of the left bionic pinna is perpendicular to the center line of the right bionic pinna, the signal time-frequency energy feature extracted after the left and the right bionic pinnae receive the echo signal in step (4) is input into two neural networks, to respectively obtain a first elevation result and a second elevation result; and the center line of the left bionic pinna is perpendicular to the center line of the right bionic pinna, the first elevation result and the second elevation result are mutual orthogonal; and space coordinates of the to-be-measured object are located by using the obtained first elevation result and the obtained second elevation result.

* * * * *